United States Patent
Andre et al.

(10) Patent No.: US 9,950,806 B2
(45) Date of Patent: Apr. 24, 2018

(54) METHOD FOR DISPLAYING AN IMAGE OF A SCENE OUTSIDE OF AN AIRCRAFT IN AN AUGMENTED REALITY CONTEXT

(71) Applicant: Airbus Operations (SAS), Toulouse (FR)

(72) Inventors: Raphael Andre, Toulouse (FR); Javier Manjon Sanchez, Toulouse (FR)

(73) Assignee: Airbus Operations (SAS), Toulouse (FR)

(*) Notice: Subject to any disclaimer, the term of this patent is extended or adjusted under 35 U.S.C. 154(b) by 78 days.

(21) Appl. No.: 15/159,318

(22) Filed: May 19, 2016

(65) Prior Publication Data

US 2016/0340054 A1    Nov. 24, 2016

(30) Foreign Application Priority Data

May 20, 2015   (FR) ...................................... 15 54525

(51) Int. Cl.
  *G09G 5/00*      (2006.01)
  *B64D 43/00*     (2006.01)
  (Continued)

(52) U.S. Cl.
  CPC ............ *B64D 43/00* (2013.01); *B64D 45/08* (2013.01); *G01C 23/005* (2013.01); *G06T 11/00* (2013.01); *G08G 5/02* (2013.01)

(58) Field of Classification Search
  CPC ....... G06T 19/006; G06T 19/00; G06F 3/011; G06F 3/012; G02B 27/017
  (Continued)

(56) References Cited

U.S. PATENT DOCUMENTS

| 6,112,141 A * | 8/2000 | Briffe ..................... G01C 23/00 345/1.3 |
| 2007/0080828 A1 | 4/2007 | He |

(Continued)

FOREIGN PATENT DOCUMENTS

| EP | 1775553 | 4/2007 |
| EP | 2128732 | 12/2009 |

OTHER PUBLICATIONS

French Search Report, dated Nov. 26, 2015, priority document.

*Primary Examiner* — Ke Xiao
*Assistant Examiner* — Gordon Liu
(74) *Attorney, Agent, or Firm* — Greer, Burns & Crain, Ltd.

(57) ABSTRACT

A method for displaying an outside scene on a cockpit display system. The system comprises two display areas contiguous along a horizontal aircraft axis and a processor to generate the display, on one of the areas, of an initial scene image from data from the aircraft's avionics electronics, the data comprising the aircraft's sideslip angle $\beta$. The processor displays, on the scene image, a flight path vector indicating a point on the scene image towards which the aircraft is heading. When the measured angle $\beta$ exceeds a threshold, the processor displays the initial scene image on a first display area and the display of a supplementary outside scene image, on a second display area, the supplementary scene image representing a lateral extension of the initial scene image. The processor also displays the flight path vector superimposed on one of the two images based on a value of angle $\beta$.

12 Claims, 5 Drawing Sheets

(51) Int. Cl.
*B64D 45/08* (2006.01)
*G06T 11/00* (2006.01)
*G08G 5/02* (2006.01)
*G01C 23/00* (2006.01)

(58) Field of Classification Search
USPC .......................................................... 345/633
See application file for complete search history.

(56) References Cited

U.S. PATENT DOCUMENTS

2009/0326744 A1 12/2009 He et al.
2015/0211883 A1* 7/2015 He ........................ G05D 1/0858
340/946

* cited by examiner

METHOD FOR DISPLAYING AN IMAGE OF A SCENE OUTSIDE OF AN AIRCRAFT IN AN AUGMENTED REALITY CONTEXT

CROSS-REFERENCES TO RELATED APPLICATIONS

This application claims the benefit of the French patent application No. 1554525 filed on May 20, 2015, the entire disclosures of which are incorporated herein by way of reference.

BACKGROUND OF THE INVENTION

The present invention generally relates to augmented reality and more particularly to a method for displaying an image of a scene outside of an aircraft in an augmented reality context. The invention also relates to an aircraft in which the cockpit is equipped with a display system for implementing said method.

Figure 1:
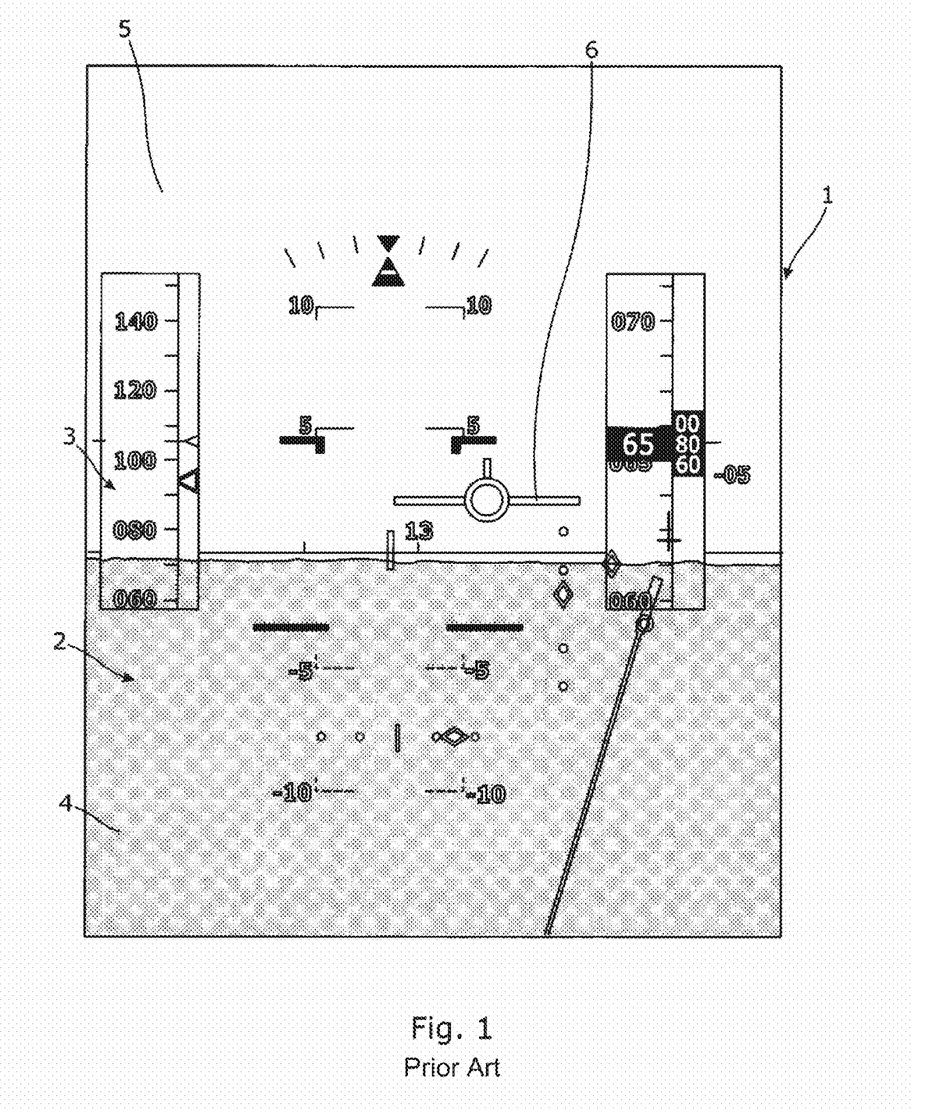
FIG. 1, already described, is a diagrammatic view of a display screen of an aircraft upon which is displayed an image of a scene outside of the aircraft in augmented reality according to the prior art.

With reference to FIG. 1, it is known to display on a screen 1 in the cockpit, such as for example the primary display screen (PDF, Primary Flight Display), a synthetic image in three dimensions of a scene 2 situated in front of the aircraft and upon which is superimposed an image comprising flight information 3 in order to enhance the image of the scene. Such a display, referred to as an augmented reality display or a synthetic vision display, makes it possible to give the pilot of the aircraft a better understanding of the environment outside of the aircraft, notably in bad weather or at night. The image of the scene comprises a terrain 4 and a generic blue sky 5 and the items of information about the terrain used for producing the image of the scene 2 are provided by onboard satellite positioning means combined with terrain databases. The items of flight information used for producing the flight information image 3 come from the avionics of the aircraft and notably comprise an FPV (Flight Path Vector) 6. The latter is conventionally a symbol representing an aircraft and indicates a point on the image of the scene 2 towards which the longitudinal axis of the aircraft is heading and is thus mobile on the screen as a function of the lateral and vertical movements of the aircraft.

Because of the small dimensions of the primary display screen 1, and in the case of the presence of strong side wind where the aircraft is in sideslip (a non-zero sideslip angle β between the air trajectory of the aircraft and its ground trajectory), the flight path vector 6 is not displayed on the screen 1 because it is situated outside of the field of vision of the terrain on the screen. However, the flight path vector 6 is an important item of information for guiding the pilot and it is necessary for it to be visible. In order to overcome this problem, processing means increase the field angle of the image of the scene 2, with a fixed image size. This being done, the image of the scene 2 represents a wider lateral extent of terrain and the flight path vector 6 then becomes visible on the screen.

The increase of the field angle reduces the magnification of the image of the scene 2 since the size of the latter remains fixed. When the field angle is too wide, the pilot is no longer able to make a comparison between the terrain of the image of the scene 2 displayed on the screen 1, which appears small and distant to him, and the real terrain which may be visible through the windows of the cockpit. The augmented reality display is therefore no longer usable.

SUMMARY OF THE INVENTION

There is therefore a need for an augmented reality display which is usable by the pilot whatever the flight path of the aircraft may be in order to display the flight path vector even in the case of strong sideslip of the aircraft.

The invention meets this need and relates to a method for displaying a scene outside of the aircraft on a display system in the cockpit of an aircraft, said system comprising two display areas contiguous along a horizontal axis of the aircraft and a processor for generating the display, on one of said two areas, of an image of a scene outside of the aircraft, called the initial scene image, from data provided by the avionics electronics of the aircraft, said data comprising the value of the sideslip angle β of the aircraft, said method comprising: the display, by the processor, superimposed on the initial scene image, of a flight path vector indicating the point on the image towards which the aircraft is heading: and when the measured value of a sideslip angle β of the aircraft exceeds a predetermined threshold value, the processor generates the display of said initial scene image on a first display area and the display of another image of a scene outside of the aircraft, called the supplementary scene image, on a second display area, the supplementary scene image representing a scene outside of the aircraft situated in the lateral extension of the scene represented in the initial scene image and wherein the processor generates moreover the display of said flight path vector superimposed on said supplementary scene image or said initial scene image respectively, as a function of the value of the sideslip angle. According to the invention, the field angle of the initial image of the scene is not modified by changing the display onto two screens so that the pilot remains able to make a comparison between the terrain displayed on the initial image of the scene and the real terrain which may be visible through the windows of the cockpit.

BRIEF DESCRIPTION OF THE DRAWINGS

The features of the invention mentioned above, as well as others, will appear more clearly on reading the following description of examples of embodiment, said description being given with reference to the appended drawings in which.

DETAILED DESCRIPTION OF THE PREFERRED EMBODIMENTS

Figure 2:
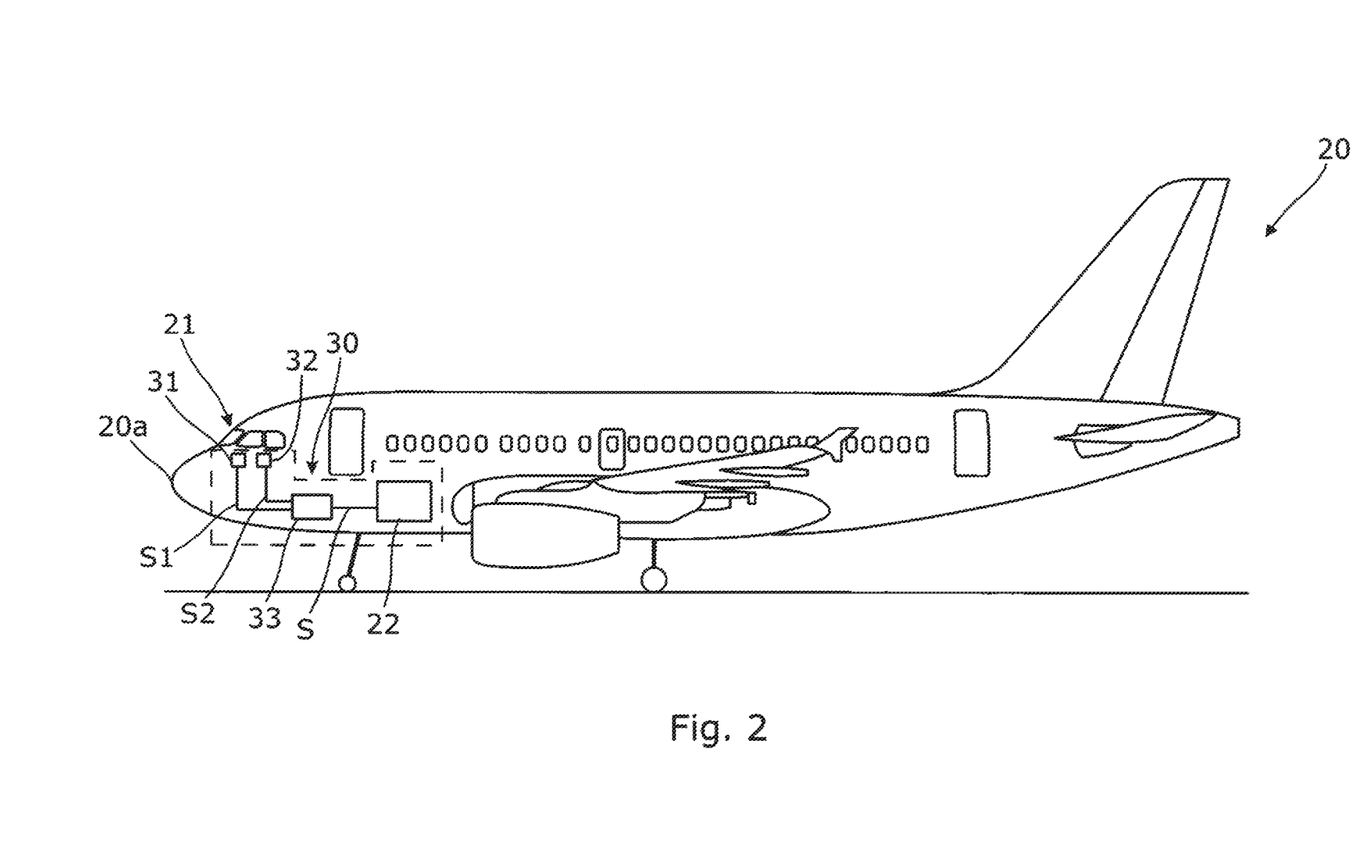
FIG. 2 is a diagrammatic view of an aircraft comprising a cockpit in which is arranged a display system for displaying an image of a scene outside of the aircraft in augmented reality according to the invention.
Figure 3:
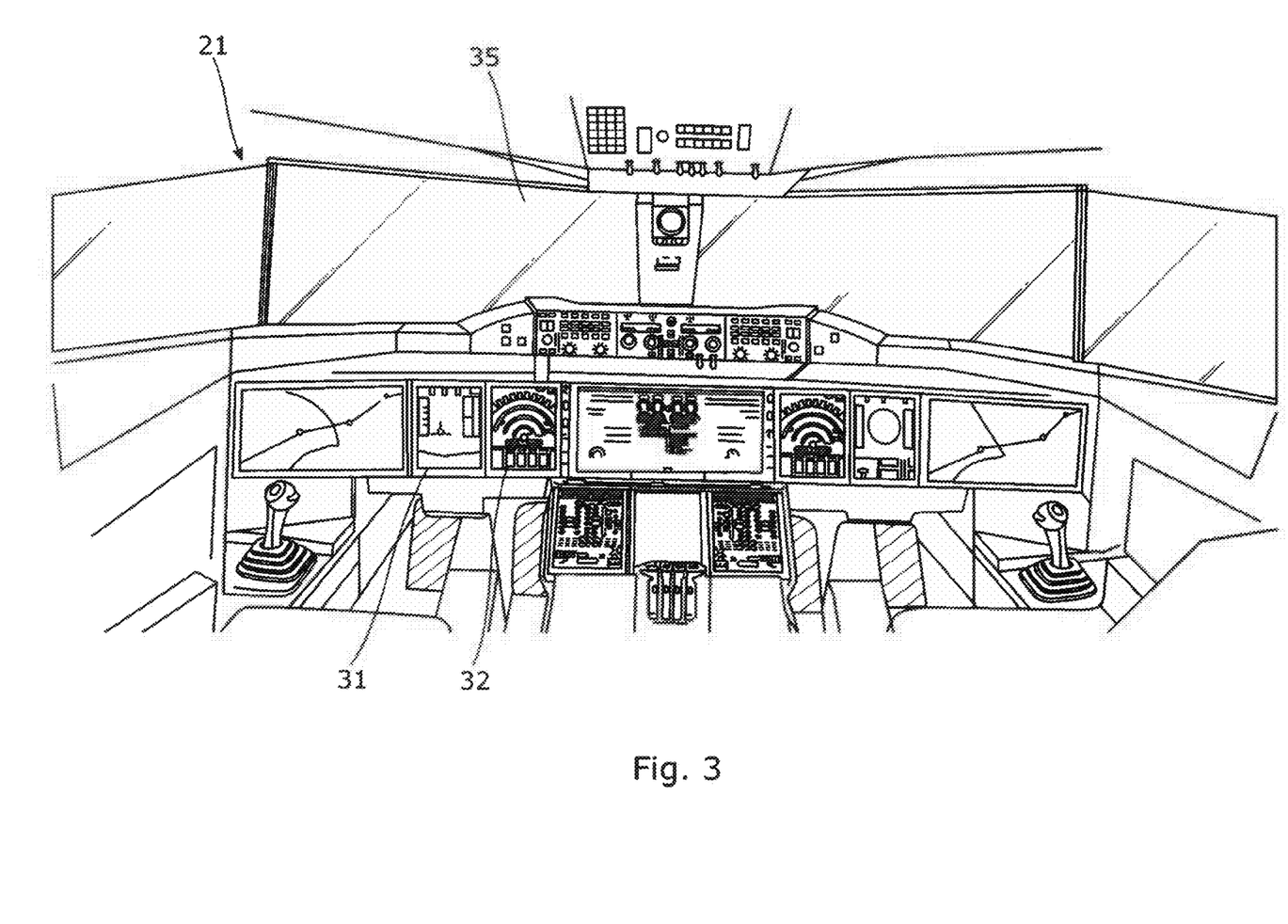
FIG. 3 is a diagrammatic view of the cockpit of the aircraft shown in FIG. 2, in which the display system comprises two screens for displaying the scene outside of the aircraft in augmented reality according to an embodiment of the invention.

With reference to FIGS. 2 and 3, an aircraft 20 according to the invention conventionally comprises a cockpit 21 situated in the nose 20a of the aircraft and avionics electronics 22 arranged, for example, in the avionics bay (not shown) of the aircraft 20 and provided for collecting flight data of the aircraft.

The avionics electronics 22 generically comprise all of the electronics installed on board the aircraft 20 and notably the computers, of the central processing unit type, associated with satellite positioning means as well as with sensors and navigation systems.

The avionics electronics 22 generate flight information, for example data relating to the flight plan of the aircraft coming from the satellite positioning means or from flight data coming from sensors, such as for example the speed of the aircraft, its altitude, its angle of attack and its sideslip angle β.

Moreover, the avionics electronics 22 comprise a terrain database in which are recorded items of terrain information such as the geographic coordinates (latitude, longitude, altitude) of points of the relief of a scene situated in front of the aircraft as well as geographic coordinates of points of interest (runways . . . ) in that same scene.

The cockpit 21 comprises in a known way a display system 30 composed of a first 31 and a second 32 display screen arranged in the cockpit and a processor 33 of the central processing unit type, for controlling the display on at least one of the screens 31, 32 of an image of the outside scene situated in front of the nose 20a of the aircraft superimposed on a flight information image so as to provide a display in augmented reality of said outside scene.

According to the invention, the processor 33 uses an algorithm in order to change the augmented reality display from one screen to two screens, as a function of the value of the sideslip angle of the aircraft.

The first screen 31 is for example a Primary Flight Display screen (PFD) while the second screen 32 is for example a Navigation Display (ND) screen. The two screens 31, 32 are contiguous along a horizontal direction when the aircraft 20 is on the ground. "Contiguous" is understood to mean close to each other, notably that the screens are not separated from each other by more than 7 cm.

Preferably, the two screens are aligned in the horizontal direction and have the same dimensions.

Figure 4:
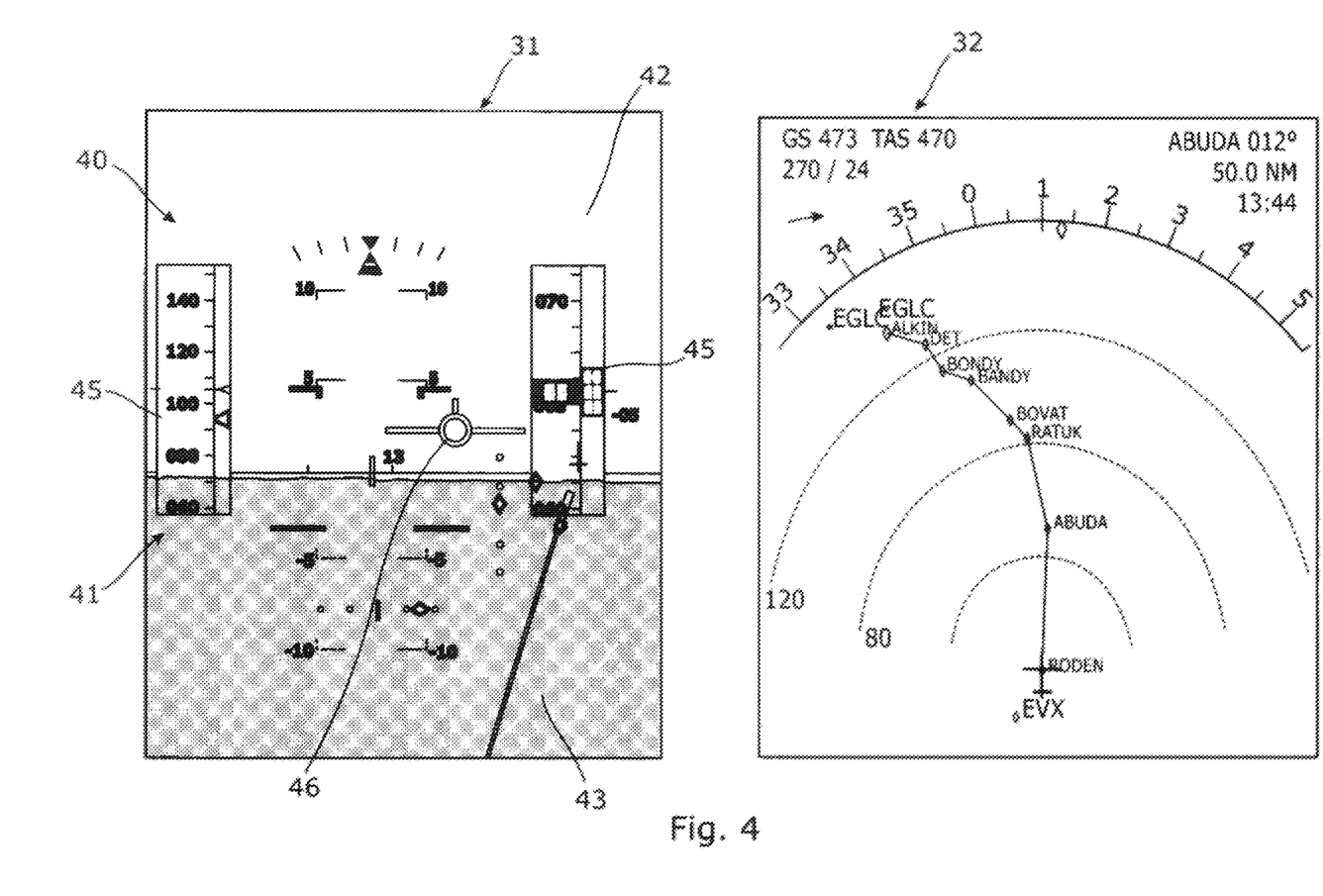
FIG. 4 is a diagrammatic view of the display on each of the two screens of the cockpit shown in FIG. 3.
Figure 5:
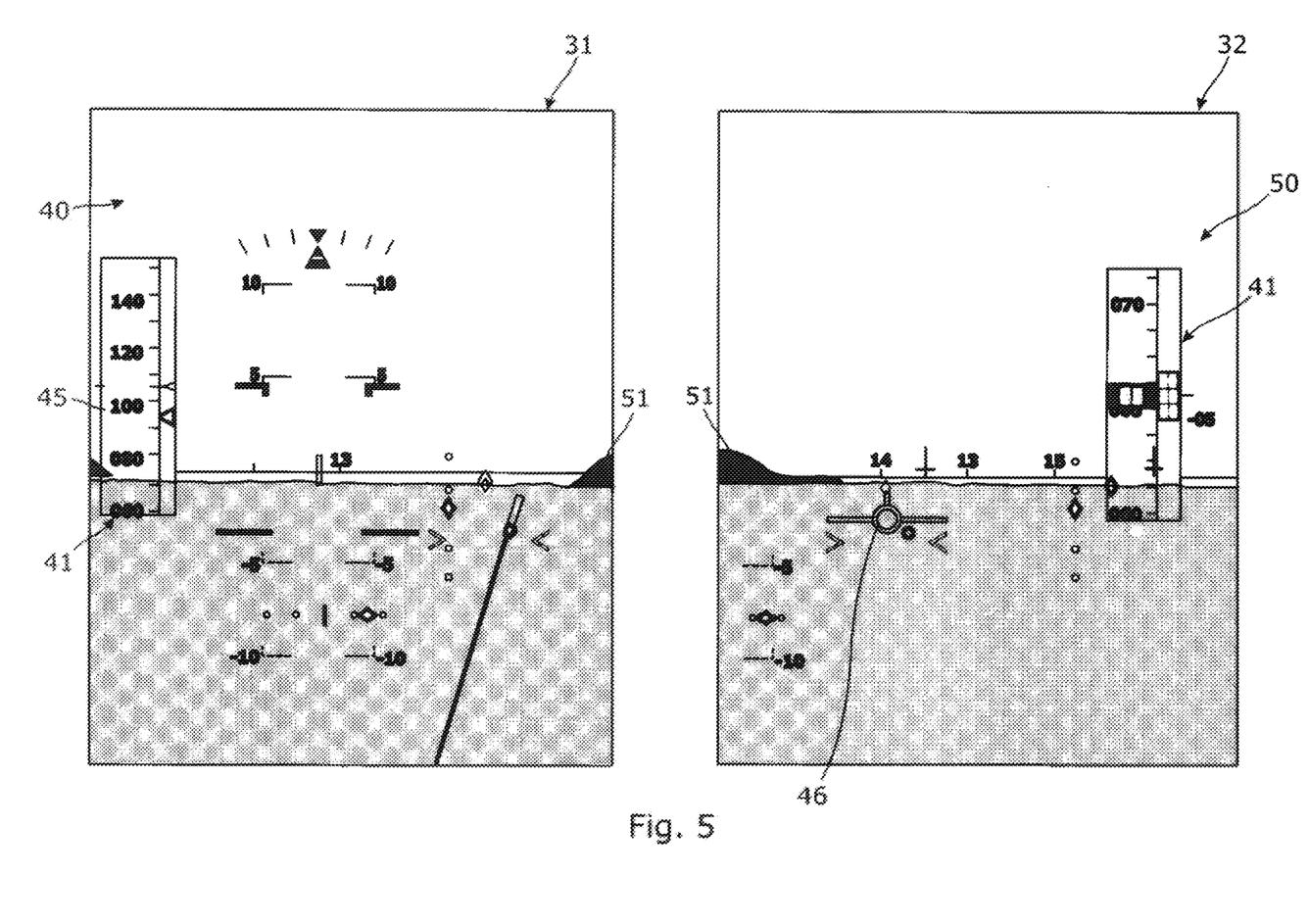
FIG. 5 is a view similar to that of FIG. 4, illustrating the modification of the display on each of the two screens of the cockpit shown in FIG. 3 when the value of the sideslip angle of the aircraft exceeds a predetermined value.

It will be noted that, in FIGS. 3 to 5, the first screen 31 is situated to the left of the second screen 32.

The processor 33 is notably connected to the avionics electronics 22 of the aircraft, from which it receives a digital signal S comprising both terrain information and flight information.

The processor 33 carries out various processings on the digital signal S in order to send a display signal S1 to the first screen 31 and a display signal S2 to the second screen 32.

With reference to FIG. 4, the signal S1 sent to the first screen results in the display of a synthetic three-dimensional image of the scene 40, called the initial image of the scene, towards which the aircraft 20 is heading and upon which is superimposed an image 41 comprising flight information.

The initial image of the scene 40 represents a generic blue sky 42 (i.e. non-varying) and a terrain 43 whose relief is according to the real relief of the terrain such as the pilot can see through the windows of the cockpit (reference 35 in FIG. 3).

In a known way, the flight information image comprises in particular a flight path vector 46.

The signal S2, sent to the second screen 32, results in the display of data relating to a function of the aircraft, such as for example data relating to navigation.

The algorithm used by the processor 33 is activated when the absolute value of the sideslip angle β of the aircraft, contained in the digital signal S and monitored by the processor 33, is greater than a predetermined value, for example greater than 15°.

Moreover, the algorithm used is dependent on the sign, also contained in the digital signal S and monitored by the processor 33, of the sideslip angle β of the aircraft. Hereafter, in a first example, it will be considered that the sideslip angle β is positive, that is to say that the aircraft sideslips towards the right.

When the algorithm is used, and with reference to FIG. 5, the processor modifies the display signal S1, S2 sent to each of the first and second screens 31, 32. The display signal S1 comprises data making it possible to display the initial image of the scene 40 while the signal S2 comprises data making it possible to display a three-dimensional synthetic image, in the same format as that of the initial image of the scene, of a scene 50 situated to the right and in continuity with the scene shown in the initial image of the scene 40. The added image is called, in the continuation of the description, a supplementary scene image 50.

As the two screens 31, 32 are contiguous, the pilot looking at the initial image of the scene and the supplementary scene image situated to its right has the impression of continuity such that he perceives only one and the same image of the outside scene with a field of view extended towards the right. Thus, for example, a part of a relief 51 (for example a mountain as shown in FIG. 5) situated, in the initial image of the scene 40, on the right of the first screen 31 will be extended on the supplementary image of the scene 50 on the left of the second screen 32.

Similarly, when the algorithm is activated, the signal S1 and the signal S2 each comprise data making it possible to display flight information on the initial image of the scene and on the supplementary scene image 50, and notably so as to display the flight path vector 46.

The invention is advantageous in the sense that if the angle of sideslip β towards the right of the aircraft is large, the flight path vector 46 is displayed on the second screen superimposed on the supplementary scene image 50. Consequently, this vector can be seen by the pilot.

In the case where the algorithm is activated and where the sign of the sideslip angle β is negative, that is to say that the aircraft is sideslipping towards the left, the principle that has just been described for a positive sideslip angle β is used again except that the processor 33 notably reverses the display of the initial scene image from the first 31 to the second 32 screen such that the supplementary scene image 50 is located to the left of the initial image of the scene 40, so that the pilot can correctly perceive the direction of sideslip of the aircraft.

Thus, in this case, the signal S2 comprises data making it possible to display the initial image of the scene while the signal S1 comprises data making it possible to display a supplementary scene image situated to the left and continuous with the scene shown in the initial image of the scene.

As the two screens are contiguous, the pilot looking at the initial image of the scene and the supplementary scene image to its left has an impression of continuity so that he perceives only one and the same image with a field of view extended towards the left. Thus, for example, a relief situated in the initial image of the scene on the left of the second screen 32 is extended over the supplementary image of the scene on the right of the first screen 31.

Moreover, the signal S1 and the signal S2 each comprise data making it possible to display on the initial image of the scene and of the supplementary scene image flight information notably in order to display the flight path vector.

If the sideslip angle β towards the left of the aircraft is large, the flight path vector is displayed on the first screen superimposed on the image of the supplementary scene. Consequently, this vector can be seen by the pilot.

Thus, in cases of presence of strong side wind where the trajectory of the aircraft is said to be in sideslip, the flight information image is displayed superimposed on the initial image of the scene and on the supplementary image of the scene. Thus, the flight path vector 46 is displayed superimposed on the supplementary scene image 50, to the left or to the right of the initial image of the scene as a function of the sign of the sideslip angle β of the aircraft. Consequently, this vector remains visible by the pilot whatever the sideslip conditions may be and the pilot can use the augmented reality display as piloting assistance.

According to the invention, the field angle of the initial image of the scene 40 is not modified by changing the display onto two screens 31, 32, so that the pilot remains able to make a comparison between the terrain represented in the initial image of the scene and the real terrain that may be visible through the windows of the cockpit.

With reference to FIG. 4, the invention is furthermore advantageous in that the threshold above which the double display algorithm is activated can be selected so that the double display is produced as soon as the flight path vector 46 is merged with one of the components of the flight information image, for example the scales 45 of speed or altitude initially positioned on the lateral edges of the screen 31. Thus, the change to double display makes it possible to shift these scales 45 to the left edge of the first screen 31 and the right edge of the second screen 32 of the widened image so that there are no longer any scales on the contiguous edges of the two screens. The readability of the augmented reality display is thus improved.

As a variant of the invention, other conditions for activation of the algorithm can be used in addition to the activation of the algorithm relative to the sideslip angle β:

These conditions are thus, for example:

Detection by the sensors of an altitude of the aircraft below a predetermined value, for example lower than 1500 feet=457 m;

Detection by the sensors of an airspeed of the aircraft below a predetermined value, for example below 180 knots=334 km/h;

Determination by the avionics electronics of a distance from the aircraft to the runway upon which the aircraft has to land that is less than a predetermined value, for example less than 10 km;

Determination by the avionics electronics that the aircraft is in a runway approach phase.

According to this variant, the determination of the position (left-right) of the screen displaying the supplementary image of the scene with respect to the screen displaying the initial image is also carried out as a function of the sign of the sideslip angle β.

Finally, without departing from the context of the present invention, instead and in place of the first and second screens, the display system can comprise a single screen having a first display area and a second display area, each dedicated to the display of a particular function.

The first area displays, for example, information similar to that which a primary flight screen would display while the second area displays information similar to that which a navigation screen would display.

That which has been described above with a first 31 and a second 32 screen is entirely transposable to this variant by considering the first area in place of the first screen and the second area in place of the second screen. This variant is an alternative technique to the description of the display system 30 having two screens given above and having identical advantages. In addition to these common advantages, this variant makes it possible to center certain scales and visual markers in the center of the single screen constituted by the two display areas.

The invention has been described by considering that the first screen 31 is situated to the left of the second screen 32. Another arrangement of the two screens could be chosen without departing from the context of the present invention, those skilled in the art being capable of adapting the disclosure of the present description to the case where the first screen would be situated to the right of the second screen.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for displaying a scene outside of an aircraft on a display system of a cockpit of an aircraft, said system comprising at least two display areas contiguous along a horizontal axis of the aircraft and a processor for generating the display, on one of said two areas, of an image of a scene outside of the aircraft, called the initial scene image, from data provided by avionics electronics of the aircraft, said data comprising the value of the sideslip angle β of the aircraft, said method comprising:

displaying, by the processor, superimposed on the initial scene image, a flight path vector indicating a point on the image of the scene towards which the aircraft is heading;

measuring the value of a sideslip angle β of the aircraft by the processor;

if the measured value of the sideslip angle β is positive and exceeds a predetermined threshold value, generating and displaying, by the processor, the display of said initial scene image on a first display area and a display of another image of a scene outside of the aircraft, called the supplementary scene image, on a second display area located to the right of the first display area, the supplementary scene image representing a scene outside of the aircraft situated in a lateral extension of the scene shown in the initial scene image;

if the measured value of the sideslip angle β is negative and exceeds the predetermined threshold value, generating and displaying, by the processor, said initial scene image on the second display area and the supplementary scene image on the first display area; and, generating, by the processor, the display of said flight path vector superimposed on said supplementary scene image or on said initial scene image, respectively, as a function of the value of the sideslip angle β.

2. The method as claimed in claim 1, wherein each display area is a display screen of the cockpit.

3. The method as claimed in claim 1, wherein the at least two display areas are two separate display areas of a same screen in the cockpit.

4. The method as claimed in claim 1, wherein the processor generates the display of the images called initial and supplementary on the display areas when at least one of the altitude of the aircraft, the speed of the aircraft or the distance from the aircraft to the runway upon which the aircraft must land, is below a predetermined value.

5. An aircraft comprising:
avionics electronics,
a cockpit in which is arranged a display system,
the display system comprising at least two display areas continuous along a horizontal direction of the aircraft and a processor for generating the display, on one of said two areas, of an image of a scene outside of the aircraft, called the initial scene image, from data provided by the avionics electronics, said data comprising the value of the sideslip angle $\beta$ of the aircraft,
the processor being configured to implement a method comprising:
displaying, by the processor, superimposed on the initial scene image, a flight path vector indicating a point on the image of the scene towards which the aircraft is heading; and
measuring the value of a sideslip angle $\beta$ of the aircraft by the processor;
if the measured value of the sideslip angle $\beta$ is positive and exceeds a predetermined threshold value, generating and displaying, by the processor, the display of said initial scene image on a first display area and a display of another image of a scene outside of the aircraft, called the supplementary scene image, on a second display area located to the right of the first display area, wherein the supplementary scene image represents a scene outside of the aircraft situated in a lateral extension of the scene shown in the initial scene image;
if the measured value of the sideslip angle $\beta$ is negative and exceeds a predetermined threshold value, generating and displaying, by the processor, said initial scene image on the second display area and the supplementary scene image on the first display area; and,
generating, by the processor, the display of said flight path vector superimposed on said supplementary scene image or on said initial scene image, respectively, as a function of the value of the sideslip angle $\beta$.

6. A method for displaying a scene outside of an aircraft on a display system of a cockpit of an aircraft, said system comprising at least two display areas contiguous along a horizontal axis of the aircraft and a processor for generating the display, on one of said two areas, of an image of a scene outside of the aircraft, called the initial scene image, from data provided by avionics electronics of the aircraft, said data comprising the value of the sideslip angle $\beta$ of the aircraft, said method comprising:

displaying, by the processor, superimposed on the initial scene image, a flight path vector indicating a point on the image of the scene towards which the aircraft is heading;
measuring the value of a sideslip angle $\beta$ of the aircraft by the processor;
if the measured value of the sideslip angle $\beta$ exceeds a predetermined threshold value, generating and displaying, by the processor, the display of said initial scene image on a first display area and a display of another image of a scene outside of the aircraft, called the supplementary scene image, on a second display area,
wherein the supplementary scene image represents a scene outside of the aircraft situated in a lateral extension of the scene shown in the initial scene image,
wherein the first display area includes a flight information image on a first edge of the first display area, and
wherein the second display area is located closer to a second edge of first display area than the first edge of the display area, the first edge and the second edge being located on opposite sides of the first display area; and,
generating, by the processor, moreover, the display of said flight path vector superimposed on said supplementary scene image or on said initial scene image, respectively, as a function of the value of the sideslip angle $\beta$.

7. The process of claim 6 wherein the flight information image comprises a scale of speed.

8. The process of claim 6 wherein the flight information image comprises an altitude.

9. The process of claim 6 further comprising:
if the measured value of the sideslip angle $\beta$ is positive and exceeds the predetermined threshold value, generating and displaying, by the processor, said initial scene image on the first display area and the supplementary scene image on the second display area located to the right of the first display area; and,
if the measured value of the sideslip angle $\beta$ is negative and exceeds a predetermined threshold value, generating and displaying, by the processor, said initial scene image on the second display area and the supplementary scene image on the first display area.

10. The method as claimed in claim 6, wherein each display area is a display screen of the cockpit.

11. The method as claimed in claim 6, wherein the at least two display areas are two separate display areas of a same screen in the cockpit.

12. The method as claimed in claim 6, wherein the processor generates the display of the images called initial and supplementary on the display areas when at least one of the altitude of the aircraft, the speed of the aircraft or the distance from the aircraft to the runway upon which the aircraft must land, is below the predetermined value.

* * * * *